United States Patent [19]

King

[11] 4,217,231

[45] Aug. 12, 1980

[54] LOW FLUID LOSS FOAM

[75] Inventor: George E. King, Tulsà, Okla.

[73] Assignee: Standard Oil Company (Indiana), Chicago, Ill.

[21] Appl. No.: 933,371

[22] Filed: Aug. 14, 1978

Related U.S. Application Data

[63] Continuation-in-part of Ser. No. 782,213, Mar. 28, 1977, abandoned.

[51] Int. Cl.² .................... E21B 43/26; E21B 43/27
[52] U.S. Cl. ........................ 252/8.55 R; 166/282; 166/283
[58] Field of Search ............... 252/8.55 R, 8.55 C, 252/8.5 A, 8.5 C, 8.55 B, 8.55 D, 307, 8.05; 166/282, 283, 307, 308

[56] References Cited

U.S. PATENT DOCUMENTS

| | | | |
|---|---|---|---|
| 2,271,695 | 2/1942 | Jones | 252/8.5 |
| 3,008,905 | 11/1961 | Wedell | 252/307 |
| 3,136,361 | 6/1964 | Marx | 166/308 |
| 3,174,929 | 3/1965 | Anderson | 252/8.55 |
| 3,177,939 | 4/1965 | Holm et al. | 166/273 |
| 3,185,634 | 5/1965 | Craig et al. | 166/274 |
| 3,215,200 | 11/1965 | Kirkpatrick et al. | 252/8.55 X |
| 3,223,186 | 12/1965 | Lummus et al. | 175/71 |
| 3,269,468 | 8/1966 | Phansalkar et al. | 252/8.5 |
| 3,297,098 | 1/1967 | Elman et al. | 175/69 |
| 3,299,953 | 1/1967 | Bernard | 166/292 |
| 3,342,261 | 9/1967 | Bond | 166/271 |
| 3,460,623 | 8/1969 | Leach | 166/273 |
| 3,572,439 | 3/1971 | Hutchinson et al. | 252/8.5 |
| 3,579,446 | 5/1971 | Kroke et al. | 252/8.05 X |
| 3,594,317 | 7/1971 | Estes et al. | 252/8.5 |
| 3,612,179 | 10/1971 | Anderson et al. | 166/281 |
| 3,844,351 | 10/1974 | Sutton et al. | 166/293 |
| 3,937,283 | 2/1976 | Blauer et al. | 252/8.55 X |
| 4,044,833 | 8/1977 | Volz | 166/307 |

FOREIGN PATENT DOCUMENTS

1000191  11/1976  Canada ................................. 166/308

OTHER PUBLICATIONS

Zieminski et al, article in Industrial and Engineering Chemistry Fundamentals, vol. 6, No. 2, May, 1967, pp. 232-242.

King, "Factors Affecting Dynamic Fluid Leakoff with Foam Fracturing Fluids," SPE paper 6817, presented at the SPE meeting held in Denver, Colorado, Oct. 9-12, 1977.

*Primary Examiner*—Herbert B. Guynn
*Attorney, Agent, or Firm*—Robert B. Stevenson; Fred E. Hook

[57] ABSTRACT

An improved method for reducing fluid loss during high pressure hydraulic fracturing of well formations using an aqueous foam involving adding to the foam from about 0.0005 to 0.5% by weight of an additive selected from the group consisting of a $C_5$ to $C_{10}$ unsubstituted monocarboxylic aliphatic acid, a $C_5$ to $C_{10}$ unsubstituted aliphatic alcohol, malonic acid, lower n-alkyl diesters of malonic acid and their mixtures. The new additives are shown to be as effective in reducing fluid loss during fracturing as the commercial practice employing hydroxy ethyl cellulose at a fraction of the cost of hydroxy ethyl cellulose without depositing polymer within the formation.

10 Claims, No Drawings

LOW FLUID LOSS FOAM

CROSS-REFERENCES TO RELATED APPLICATIONS

This is a continuation-in-part of a prior application, Ser. No. 782,213, filed on Mar. 28, 1977, now abandoned.

BACKGROUND OF THE INVENTION

1. Field of the Invention

This invention relates to foamed aqueous fluids to be introduced into a well. More specifically, it is concerned with foam additives which lower the fluid loss of the foam during injection of the foam into a gas or oil well.

2. Description of the Prior Art

In most, if not all, applications where fluids are introduced into a well, fluid loss is a significant problem. In enhanced recovery techniques, differences in permeability of various zones can result in some formations being bypassed and not contacted by the driving fluid. Similar bypassing can occur during acidizing, with some portions of the formation not being adequately contacted by the acid. Though not normally so described, as used herein, the term "fluid loss" is intended to include such bypassing during enhanced recovery or acidizing.

Foams have a number of advantages, including generally lower fluid loss, and have been used in a variety of operations where fluids are introduced into a well.

In the past, aqueous foams have been used in hydraulic fracturing operations as described, for example, in the following U.S. Pat. Nos.: 3,136,361, issued to Marx on June 9, 1964; and 3,937,283, issued to Blauer, et al., on Feb. 10, 1976 (see also Canadian Pat. No. 1,000,191, issued to Plummer, et al., on Nov. 23, 1976).

Foams have also been used in well cementing operations, as disclosed, for example, in the following U.S. Pat. Nos.: 3,844,351, issued to Sutton, et al., on Oct. 29, 1974; and 3,299,953, issued to Bernard on Jan. 24, 1967.

Aqueous foams have also been used in enhanced recovery, as described, for example, in the following U.S. Pat. Nos.: 3,185,634, issued to Craig, et al., on May 25, 1965; 3,460,623, issued to Leach on Aug. 12, 1969; and 3,177,939, issued to Holm, et al., on Apr. 13, 1965.

Foams have been used in acidizing, as disclosed, for example, in the following U.S. Pat. Nos.: 3,174,929, issued to Andersen on Mar. 23, 1965; and 3,612,179, issued to Anderson, et al., on Oct. 12, 1971.

Other uses of foams have been in drilling operations, as disclosed, for example, in the following U.S. Pat. Nos.: 3,223,186, issued to Lummus, et al., on Dec. 14, 1965; 3,215,200, issued to Kirkpatrick, et al., on Nov. 2, 1965; and 3,297,098, issued to Elman, et al., on Jan. 10, 1967.

Typically, of course, these aqueous foams may contain a number of additives, both liquid and solid, in addition to the gas used for foaming. A large number of surfactants (or foaming agents) have been used with foams and the surfactants listed in U.S. Pat. No. 3,342,261, issued to Bond on Sept. 19, 1967, are typical.

SUMMARY OF THE INVENTION

It has been discovered that certain alcohols, organic acids and esters are compatible with aqueous foams and especially with high-pressure foam; and that a quite small addition provides for a significantly lower fluid loss foam. This invention employs certain alcohols and/or organic acids (those unsubstituted alcohols and unsubstituted aliphatic monocarboxylic acids having between 5 and 10 carbon atoms), malonic acid, lower n-alkyl diesters of malonic acid, and their mixtures in connection with the use of aqueous foams in operations such as enhanced recovery, hydraulic fracturing, well cementing, acidizing, and drilling.

DESCRIPTION OF THE PREFERRED EMBODIMENT

Minimizing fluid loss both generally reduces the amount of fluid required (and thus the cost) and improves performance. In cementing, for example, less cement is required because less cement slurry is lost to the formation. In acidizing or enhanced recovery, less fluid will be required to do the job, again because less fluid is lost to the formation. In many formations, foam can be used and it is well-known that foams reduce fluid loss. My additives provide a significant further lowering of fluid loss.

It is especially surprising that the alcohols of my invention lower the fluid loss as these alcohols were widely believed to be defoamers of aqueous foams (see U.S. Pat. No. 2,271,695, issued to Jones on Feb. 3, 1942; and 3,594,317, issued to Estes, et al., on July 20, 1971) and defoamers would, of course, be incompatible with foamed fluids. My tests have shown that in low concentrations, and especially at elevated pressures (greater than 500 psi), these additives not only were compatible with foam, but also significantly lowered fluid loss.

Tests were run under controlled conditions to evaluate the fluid loss. In these tests, highly pressurized, 80-quality foam (1500 psi) was applied to one side of a disc-shaped material of known permeability (0.2-inch thick wafers from actual core samples were used), and the flow rate (leak-off rate) through the core wafer to the lower pressure (500 psi) side was measured. A more detailed description of the apparatus and test procedure employed can be found in an article entitled "Factors Affecting Dynamic Fluid Leakoff with Foam Fracturing Fluids", presented by the present inventor at the SPE meeting held in Denver, Colorado, Oct. 9–12, 1977 referred to as SPE Paper 6817 here incorporated by reference.

In one set of tests the leak-off rate was measured through an 0.04 millidarcy permeability core wafer both with and without the addition of 0.05 volume % (about 0.0425 wt.%) of octyl alcohol. The leak-off rate without the alcohol was more than two and one-half times the rate with the alcohol (leak-off ratio of 2.7). Although the leak-off rates varied with concentration and porosity, other $C_5$–$C_{10}$ alcohols and the $C_5$–$C_{10}$ organic acids and mixtures two also give significant reductions. Examples of test results are shown in Table I below (additives in Table I are in percent by volume).

TABLE I

| Foam Additive | Core Wafer Permeability (md) | Leak-off Ratio |
| --- | --- | --- |
| 0.05% Octyl Alcohol | 0.04 | 2.7 |
| 0.005% Octyl Alcohol Plus 0.005% Octanoic Acid | 0.083 | 1.6 |
| 0.005% Octyl Alcohol Plus 0.005% Octanoic Acid | 8.0 | 5.0 |
| 0.05% Hexanoic Acid | 0.04 | 2.8 |
| 0.05% Diethyl Malonate | 0.04 | 3.42 |

TABLE I-continued

| Foam Additive | Core Wafer Permeability (md) | Leak-off Ratio |
|---|---|---|
| 0.01% Malonic Acid | 0.17 | 2.14 |

It is known that polymers can be used in 0.1 to 5% by weight concentrations to reduce the fluid loss in foamed systems. Generally, these are the same very long chained polymers which are used as viscosity builders in non-clay drilling systems or as diverting agents in acidizing and enhanced recovery in amounts limited by the maximum practical viscosity of the foam. Carboxy methyl cellulose and hydroxy ethyl cellulose (with molecular weights generally greater than 50,000) are two examples. My additives are compatible with such systems and do not significantly alter the viscosity. The combination of these viscosifiers and my fluid loss additives provides an even lower fluid loss than either of the agents used individually in the maximum practical amount. In particular, in one set of tests in the aforedescribed test apparatus, a typical amount of the viscosifier gave similar results to the maximum soluble amount (about 0.05% by volume) of octyl alcohol, but when a small portion of the viscosifier (0.06 wt.%) was replaced with a slightly smaller amount of this additive (0.0425 wt. %) the combination gave an even further reduction in fluid loss. These results are summarized in Table II (additives in Table II are in wt. %).

Similar ratios of performance were obtained with a variety of core wafers having a variety of permeabilities, and while the fluid loss was higher in the samples with higher permeability, the improvement ratio remained significant. For a given maximum viscosity, the combination of viscosifier plus my additive(s) provides the minimum fluid loss.

TABLE II

| Foam Additive | Core Wafer Permeability (md) | Leak-Off Ratio |
|---|---|---|
| 1.26% Hydroxy Ethyl Cellulose | 0.04 | 2.5 |
| 0.0425% Octyl Alcohol | 0.04 | 2.7 |
| 1.2% Hydroxy Ethyl Cellulose Plus 0.0425% Octyl Alcohol | 0.04 | 3.5 |

The use of a long chain polymer viscosifier can, however, result in a long-term lowering of formation permeability and this is often quite detrimental. In an acidizing treatment, for example, it is desired to increase the flow of gas and/or oil into the wellbore and anything which lowers the long-term formation permeability is to be avoided. Unlike the polymer viscosifiers, my additives (being truly soluble both in oil and water at the concentrations specified) remain dissolved and therefore do not provide any significant long-term decrease in formation permeability. Thus, in operations such as fracturing or acidizing, it is preferable to use my additives alone, rather than the viscosifier alone or the combination of a viscosifier plus my additive.

It should also be noted that my additives are used in quite small amounts compared to the viscosifiers. Generally, I have found that 0.05% by volume (about 0.04% by weight) of one of my additives is about equal to 15 pounds per thousand gallons (about 1.8% by weight) of a viscosifier such as hydroxy ethyl cellulose. At a viscosifier cost of about $3.50 per pound and an octyl alcohol cost of about $1.00 per gallon, the viscosifier costs over one hundred times as much to achieve the same reduction in fluid loss.

The exact mechanism by which these certain alcohols, organic acids, and/or esters reduce fluid loss at hydraulic fracturing pressures is not known. In fact, there has been some disagreement on how foam itself flows through a porous medium. It has been theorized that bubbles block the pores for a time with the gas slowly dissolving in the liquid and diffusing through the pore until the bubble size decreases and pressure forces it through the pore. Of course, slowing this process would slow the flow and lower the fluid loss. My additives may work by slowing the dissolving and/or the diffusion of the gas. In a paper entitled "Behavior of Air Bubbles in Dilute Aqueous Solutions" and published in Volume VI, No. 2, May, 1967, on pages 233-42 of the Industrial and Engineering Chemistry Fundamental Magazine, Zieminski, et al., indicate that at least some concentration of additives of this type reduces the rate of oxygen transfer from air bubbles to water. Although Zieminski noted the effect on oxygen contained in air and nitrogen was generally used in my experiments, the mechanism of slowing the flow may be related.

Generally, the foam is to be used in about 55-95% quality (55-95% of the total volume at working pressure is gas) and about 65-90% quality is preferred. Tests comparing 70%, 80%, and 90% quality foams showed that fluid loss did not vary significantly with foam quality.

Normally, the fluids to be introduced into a well will contain several ingredients (possibly including suspended solids) as appropriate for the particular operation being performed, as known in the art. Typical ingredients for the various types of treatments are generally illustrated in the aforementioned patents.

It is generally more convenient to mix my additives with the water and the other liquid ingredients first, then add any solids which are to be suspended in the fluid. The liquid is then pressurized and gas added to produce a pressurized, foamed fluid. Generally, it is convenient to add the gas as the fluid is being introduced into the well.

The amount of fluid loss additive is generally from about 0.0005% by volume of the aqueous liquid (before the gas is added) up to the maximum soluble amount. As increased effectiveness is generally obtained by increasing the amount of the additive dissolved, and only quite limited quantities of these additives are soluble in water, the cost is not normally critical. Systems saturated with the additive(s) of my invention are preferred.

Many other gases would apparently perform in a similar manner, but nitrogen and air are inexpensive, generally effective, and convenient. In most instances, liquid nitrogen tank trucks are readily available, and the use of nitrogen avoids injecting oxygen and contamination from the air into the formation.

As alcohols and organic acids having less than five carbon atoms acts as foam breakers and alcohols and organic acids having more than ten carbon atoms are quite limited in effectiveness due to their low solubility, only the $C_5$ through $C_{10}$ compounds are appropriate. The best compromise between effectiveness and solubility, (and therefore the best fluid loss performance) is obtained by using alcohols and/or monocarboxylic acids with six to nine carbon atoms. The $C_3$ dicarboxylic acid (malonic acid) and the simple lower n-alkyl diesters thereof (diethyl malonate, etc.) have been found to be equivalent to the $C_5$ to $C_{10}$ monocarboxylic acids and alcohols. It should also be noted that the aliphatic, rather than the cyclic, compounds have the desired qualities and are to be used. In terms of cost and availability, hexanoic acid and octyl alcohol are preferred. Capryl alcohol, as normally marketed, is a $C_8$ alcohol with minor impurities and is an effective and relatively inexpensive way of adding octyl alcohol. An essentially equal volume mixture of octyl alcohol and hexanoic acid is particularly preferred from a foam stability plus cost effectiveness view.

By way of example, the following formulation is appropriate for a 50,000-gallon foam hydraulic fracturing job on a formation at 3950 ft down 5½ inch casing. In this particular design a 5,000-gallon pad is introduced first, followed by 45,000 gallons of sand-carrying foam. An initial solution is prepared by mixing 8.75 gallons of octyl alcohol and 87.5 gallons of surfactant in 17,500 gallons of water. Ten percent of this mixture is used for the pad with approximately 120,000 standard cubic feet (scf) of nitrogen gas being added to produce the foam. Sixty-seven thousand five hundred pounds of sand are added to the remaining 90% of the original water-octyl alcohol mixture and then approximately 1,080,000 scf of nitrogen is added to produce approximately 1.5 lb of sand/gallon in 45,000 gallons of sand-carrying foam.

As an additional example, the following is a design of a 25,000 gallon foam acidizing treatment at 3100 ft. It uses 8750 gallons of 15% concentration HCl, 44 gallons of foaming agent (an alkyl aryl sulfonate), 0.5 gallon of hexanoic acid, and 297,896 scf of nitrogen. The hexanoic acid and foaming agent are mixed in the hydrochloric acid. This acid mix is then pumped at 5.25 barrels per minute to the wellhead, where nitrogen is injected at a rate of 7,507 scf per minute. This results in a 65 quality foam being introduced into the well at a rate of 15 barrels per minute.

Similarly, of course, these fluid loss additives can be used in aqueous forms for well cementing purposes, for enhanced recovery, or for a drilling fluid for drilling wells.

The invention is not to be construed as limited to the particular forms described herein, since these are to be regarded as illustrative rather than restrictive. The invention is intended to cover all compositions and processes which do not depart from the spirit and scope of the invention.

I claim:

1. A method for hydraulic fracturing of a well formation comprising the step of injecting into a well under high pressure sufficient to fracture the formation an aqueous foam containing an additive which reduces the fluid loss during hydraulic fracturing selected from the group consisting of an unsubstituted monocarboxylic aliphatic acid having five to ten carbon atoms, an unsubstituted aliphatic alcohol having five to ten carbon atoms, malonic acid, lower n-alkyl diesters of malonic acid and their mixtures.

2. A method of claim 1 wherein said additive is selected from the group consisting of an unsubstituted monocarboxylic aliphatic acid and an unsubstituted aliphatic alcohol, each having five to ten carbon atoms.

3. A method of claim 2 wherein said additive has from six to nine carbon atoms.

4. A method of claim 1 wherein said additive is hexanoic acid.

5. A method of claim 1 wherein said additive is octyl alcohol.

6. A method of claim 1 wherein said additive is malonic acid.

7. A method for hydraulic fracturing of a well formation comprising the step of injecting into a well under high pressure sufficient to fracture the formation an aqueous foam containing as an additive to reduce fluid loss during hydraulic fracturing diethyl malonate.

8. A method of claim 1 wherein said additive is a mixture of hexanoic acid and octyl alcohol.

9. A method of claim 1 wherein said aqueous foam also contains a polymer additive selected from the group consisting of carboxy methyl cellulose and hydroxy ethyl cellulose.

10. A method of claim 9 wherein said polymer additive is hydroxy ethyl cellulose.

* * * * *